United States Patent
Shemesh et al.

(10) Patent No.: US 12,277,216 B2
(45) Date of Patent: Apr. 15, 2025

(54) TECHNIQUES FOR IMPROVED VIRTUAL INSTANCE INSPECTION UTILIZING DISK CLONING

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/456,942

(22) Filed: Aug. 28, 2023

(65) Prior Publication Data

US 2023/0418931 A1   Dec. 28, 2023

Related U.S. Application Data (63) Continuation of application No. 17/664,508, filed on May 23, 2022.

(51) Int. Cl.
*G06F 21/53* (2013.01)
*G06F 3/06* (2006.01)
*G06F 9/455* (2018.01)

(52) U.S. Cl.
CPC .............. *G06F 21/53* (2013.01); *G06F 3/067* (2013.01); *G06F 2009/45562* (2013.01)

(58) Field of Classification Search
CPC .................................. G06F 21/53; G06F 3/067
(Continued)

(56) References Cited

U.S. PATENT DOCUMENTS 6,910,132 B1   6/2005   Bhattacharya
7,627,652 B1   12/2009  Commons et al.
(Continued)

FOREIGN PATENT DOCUMENTS

EP    4160983 A1   4/2023
EP    4254869 A2   10/2023
(Continued)

OTHER PUBLICATIONS

International Search Report, PCT/IB23/55312. ISA/US, Commissioner for Patents, Alexandria, Virginia. Dated Aug. 30, 2023.
(Continued)

*Primary Examiner* — Hosain T Alam
*Assistant Examiner* — Zubair Ahmed
(74) *Attorney, Agent, or Firm* — M&B IP Analysts, LLC (57) ABSTRACT

A system and method for inspecting virtual instances in a cloud computing environment for cybersecurity threats utilizing disk cloning. The method includes: selecting a virtual instance in a cloud computing environment, wherein the virtual instance includes a disk having a disk descriptor with an address in a cloud storage system; generating an instruction to clone the disk of the virtual instance, the instruction when executed causes generation of a cloned disk descriptor, the cloned disk descriptor having a data field including the address of the disk of the virtual instance; inspecting the cloned disk for a cybersecurity threat; and releasing the cloned disk in response to completing the inspection of the cloned disk.

23 Claims, 5 Drawing Sheets

(58) Field of Classification Search
USPC .................................................. 711/154, 100
See application file for complete search history.

(56) References Cited

U.S. PATENT DOCUMENTS

| | | |
|---|---|---|
| 7,784,101 B2 | 8/2010 | Verbowski et al. |
| 8,200,965 B2 | 6/2012 | Fujibayashi et al. |
| 8,352,431 B1 | 1/2013 | Protopopov et al. |
| 8,412,688 B1 | 4/2013 | Armangau et al. |
| 8,413,239 B2 | 4/2013 | Sutton |
| 8,417,967 B2 | 4/2013 | Foster et al. |
| 8,499,354 B1 | 7/2013 | Satish et al. |
| 8,595,822 B2 | 11/2013 | Schrecker et al. |
| 8,701,200 B2 | 4/2014 | Naldurg et al. |
| 8,789,049 B2 | 7/2014 | Hutchins et al. |
| 8,813,234 B1 | 8/2014 | Bowers et al. |
| 8,898,481 B1 | 11/2014 | Osburn, III et al. |
| 8,904,525 B1 | 12/2014 | Hodgman et al. |
| 8,914,406 B1 | 12/2014 | Haugsnes |
| 9,009,836 B1 | 4/2015 | Yarykin et al. |
| 9,094,379 B1 | 7/2015 | Miller |
| 9,119,017 B2 | 8/2015 | Sinha |
| 9,165,142 B1 | 10/2015 | Sanders et al. |
| 9,172,621 B1 | 10/2015 | Dippenaar |
| 9,185,136 B2 | 11/2015 | Dulkin et al. |
| 9,330,273 B2 | 5/2016 | Khetawat et al. |
| 9,369,433 B1 | 6/2016 | Paul |
| 9,419,996 B2 | 8/2016 | Porat |
| 9,438,634 B1 | 9/2016 | Ross et al. |
| 9,467,473 B2 | 10/2016 | Jayaraman |
| 9,544,327 B1 | 1/2017 | Sharma et al. |
| 9,563,385 B1 | 2/2017 | Kowalski et al. |
| 9,569,328 B2 | 2/2017 | Pavlov et al. |
| 9,582,662 B1 | 2/2017 | Messick et al. |
| 9,596,235 B2 | 3/2017 | Badam et al. |
| 9,607,104 B1 | 3/2017 | Turner et al. |
| 9,646,172 B1 | 5/2017 | Hahn |
| 9,661,009 B1 | 5/2017 | Karandikar et al. |
| 9,672,355 B2 | 6/2017 | Titonis et al. |
| 9,712,503 B1 | 7/2017 | Ahmed |
| 9,892,261 B2 | 2/2018 | Joram et al. |
| 10,002,247 B2 | 6/2018 | Suarez et al. |
| 10,032,032 B2 | 7/2018 | Suarez et al. |
| 10,063,445 B1 | 8/2018 | Preece |
| 10,135,826 B2 | 11/2018 | Reddy |
| 10,229,125 B2 | 3/2019 | Goodman et al. |
| 10,255,370 B2 | 4/2019 | Carpenter et al. |
| 10,360,025 B2 | 7/2019 | Foskett et al. |
| 10,412,103 B2 | 9/2019 | Haugsnes |
| 10,412,109 B2 | 9/2019 | Loureiro et al. |
| 10,459,664 B1 | 10/2019 | Dreier et al. |
| 10,503,904 B1 | 12/2019 | Singh et al. |
| 10,536,471 B1 | 1/2020 | Derbeko et al. |
| 10,540,499 B2 | 1/2020 | Wailly et al. |
| 10,552,610 B1 | 2/2020 | Vashisht et al. |
| 10,554,507 B1 | 2/2020 | Siddiqui et al. |
| 10,567,468 B2 | 2/2020 | Perlmutter |
| 10,572,226 B2 | 2/2020 | Biskup et al. |
| 10,574,675 B2 | 2/2020 | Peppe et al. |
| 10,623,386 B1 | 4/2020 | Bernat et al. |
| 10,630,642 B2 | 4/2020 | Clark et al. |
| 10,664,619 B1 | 5/2020 | Marelas |
| 10,691,636 B2 | 6/2020 | Tabaaloute et al. |
| 10,721,260 B1 | 7/2020 | Schlarp et al. |
| 10,725,775 B2 | 7/2020 | Suarez et al. |
| 10,735,430 B1 | 8/2020 | Stoler |
| 10,735,442 B1 | 8/2020 | Swackhamer |
| 10,791,138 B1 | 9/2020 | Siddiqui et al. |
| 10,803,188 B1 | 10/2020 | Rajput et al. |
| 10,831,898 B1 | 11/2020 | Wagner |
| 10,915,626 B2 | 2/2021 | Tang |
| 10,924,503 B1 | 2/2021 | Pereira et al. |
| 10,972,484 B1 | 4/2021 | Swackhamer |
| 10,997,293 B2 | 5/2021 | Wiest et al. |
| 11,005,860 B1 | 5/2021 | Glyer et al. |
| 11,016,954 B1 | 5/2021 | Babocichin et al. |
| 11,044,118 B1 | 6/2021 | Reed et al. |
| 11,055,414 B2 | 7/2021 | Claes |
| 11,064,032 B1 | 7/2021 | Yang et al. |
| 11,099,976 B2 | 8/2021 | Khakare et al. |
| 11,102,231 B2 | 8/2021 | Kraning et al. |
| 11,165,652 B1 | 11/2021 | Byrne |
| 11,216,563 B1 * | 1/2022 | Veselov ............. H04L 63/1408 |
| 11,245,730 B2 | 2/2022 | Bailey |
| 11,271,961 B1 | 3/2022 | Berger |
| 11,334,670 B2 | 5/2022 | Franco et al. |
| 11,366,897 B1 | 6/2022 | Ramanathan et al. |
| 11,388,183 B2 | 7/2022 | Hoopes et al. |
| 11,397,808 B1 | 7/2022 | Prabhu et al. |
| 11,405,426 B2 | 8/2022 | Nguyen |
| 11,444,974 B1 | 9/2022 | Shakhzadyan |
| 11,483,317 B1 | 10/2022 | Bolignano et al. |
| 11,496,498 B2 | 11/2022 | Wright et al. |
| 11,496,519 B1 | 11/2022 | Gupta et al. |
| 11,503,063 B2 | 11/2022 | Rao |
| 11,507,672 B1 | 11/2022 | Pagnozzi et al. |
| 11,516,222 B1 | 11/2022 | Srinivasan et al. |
| 11,520,907 B1 | 12/2022 | Borowiec et al. |
| 11,546,360 B2 | 1/2023 | Woodford et al. |
| 11,556,659 B1 | 1/2023 | Kumar et al. |
| 11,558,401 B1 | 1/2023 | Vashisht et al. |
| 11,558,423 B2 | 1/2023 | Gordon et al. |
| 11,567,751 B2 | 1/2023 | Cosentino et al. |
| 11,570,090 B2 | 1/2023 | Shen et al. |
| 11,575,696 B1 | 2/2023 | Ithal et al. |
| 11,606,378 B1 | 3/2023 | Delpont et al. |
| 11,614,956 B2 | 3/2023 | Tsirkin et al. |
| 11,645,390 B2 | 5/2023 | Vijayvargiya et al. |
| 11,662,928 B1 | 5/2023 | Kumar et al. |
| 11,663,340 B2 | 5/2023 | Wu et al. |
| 11,669,386 B1 | 6/2023 | Abrol |
| 11,700,233 B2 | 7/2023 | St. Pierre |
| 11,750,566 B1 | 9/2023 | Montilla Lugo |
| 11,757,844 B2 | 9/2023 | Xiao |
| 11,770,398 B1 | 9/2023 | Erlingsson |
| 11,792,284 B1 | 10/2023 | Nanduri |
| 11,799,874 B1 | 10/2023 | Lichtenstein et al. |
| 11,803,766 B1 | 10/2023 | Srinivasan |
| 11,831,670 B1 | 11/2023 | Molls et al. |
| 11,841,945 B1 | 12/2023 | Fogel et al. |
| 11,914,707 B1 | 2/2024 | Ramanathan et al. |
| 11,922,220 B2 | 3/2024 | Haghighat et al. |
| 11,936,785 B1 | 3/2024 | Shemesh et al. |
| 12,019,770 B2 | 6/2024 | Nilsson et al. |
| 12,050,696 B2 | 7/2024 | Pieno et al. |
| 12,058,177 B2 | 8/2024 | Crabtree et al. |
| 2003/0188194 A1 | 10/2003 | Currie et al. |
| 2003/0217039 A1 | 11/2003 | Kurtz et al. |
| 2005/0050365 A1 | 3/2005 | Seki et al. |
| 2005/0251863 A1 | 11/2005 | Sima |
| 2005/0283645 A1 | 12/2005 | Turner et al. |
| 2007/0174915 A1 | 7/2007 | Gribble et al. |
| 2007/0271360 A1 | 11/2007 | Sahita et al. |
| 2008/0075283 A1 | 3/2008 | Takahashi |
| 2008/0221833 A1 | 9/2008 | Brown et al. |
| 2008/0307020 A1 | 12/2008 | Ko et al. |
| 2008/0320594 A1 | 12/2008 | Jiang |
| 2009/0106256 A1 | 4/2009 | Safari et al. |
| 2009/0271863 A1 | 10/2009 | Govindavajhala et al. |
| 2010/0242082 A1 | 9/2010 | Keene et al. |
| 2010/0281275 A1 | 11/2010 | Lee et al. |
| 2011/0055361 A1 | 3/2011 | Dehaan |
| 2011/0276806 A1 | 11/2011 | Casper et al. |
| 2012/0110651 A1 | 5/2012 | Van Biljon et al. |
| 2012/0297206 A1 | 11/2012 | Nord et al. |
| 2013/0024940 A1 | 1/2013 | Hutchins et al. |
| 2013/0054890 A1 | 2/2013 | Desai et al. |
| 2013/0124669 A1 | 5/2013 | Anderson et al. |
| 2013/0160119 A1 | 6/2013 | Sartin |
| 2013/0160129 A1 | 6/2013 | Sartin |
| 2013/0290708 A1 | 10/2013 | Diaz et al. |
| 2014/0096134 A1 | 4/2014 | Barak |
| 2014/0115578 A1 | 4/2014 | Cooper et al. |
| 2014/0237537 A1 | 8/2014 | Manmohan |

(56) References Cited

U.S. PATENT DOCUMENTS

| | | |
|---|---|---|
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0095995 A1 | 4/2015 | Bhalerao |
| 2015/0163192 A1 | 6/2015 | Jain |
| 2015/0172321 A1 | 6/2015 | Kirti et al. |
| 2015/0254364 A1 | 9/2015 | Piduri et al. |
| 2015/0304302 A1 | 10/2015 | Zhang et al. |
| 2015/0310215 A1 | 10/2015 | McBride et al. |
| 2015/0319160 A1 | 11/2015 | Ferguson et al. |
| 2016/0063466 A1 | 3/2016 | Sheridan et al. |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1 | 8/2016 | Munk |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0180421 A1 | 6/2017 | Shieh et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0300690 A1 | 10/2017 | Ladnai et al. |
| 2017/0034198 A1 | 12/2017 | Powers et al. |
| 2017/0374136 A1* | 12/2017 | Ringdahl ............. G06F 9/5077 |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0081640 A1 | 3/2018 | Collins |
| 2018/0150412 A1 | 5/2018 | Manasse |
| 2018/0159882 A1 | 6/2018 | Brill |
| 2018/0181310 A1* | 6/2018 | Feinberg ................. H04L 67/10 |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0276084 A1* | 9/2018 | Mitkar ............... G06F 11/3006 |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory et al. |
| 2018/0341768 A1 | 11/2018 | Marshall et al. |
| 2018/0359058 A1 | 12/2018 | Kurian |
| 2018/0359059 A1 | 12/2018 | Kurian |
| 2018/0367548 A1 | 12/2018 | Stokes, III et al. |
| 2019/0007271 A1 | 1/2019 | Rickards et al. |
| 2019/0018961 A1 | 1/2019 | Kostyushko et al. |
| 2019/0043201 A1 | 2/2019 | Strong et al. |
| 2019/0058722 A1 | 2/2019 | Levin et al. |
| 2019/0068617 A1 | 2/2019 | Coleman |
| 2019/0068627 A1 | 2/2019 | Thampy |
| 2019/0081963 A1 | 3/2019 | Waghorn |
| 2019/0104140 A1 | 4/2019 | Gordeychik et al. |
| 2019/0116111 A1 | 4/2019 | Izard et al. |
| 2019/0121986 A1 | 4/2019 | Stopel et al. |
| 2019/0132350 A1 | 5/2019 | Smith et al. |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012659 A1 | 1/2020 | Dageville et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1 | 7/2020 | Shua |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0014265 A1 | 1/2021 | Hadar et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1 | 5/2021 | Hill et al. |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1 | 7/2021 | Burle et al. |
| 2021/0263802 A1 | 8/2021 | Gottemukkula et al. |
| 2021/0297447 A1 | 9/2021 | Crabtree et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1* | 10/2021 | Shua ................. H04L 63/1441 |
| 2021/0334386 A1 | 10/2021 | AlGhamdi et al. |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1 | 12/2021 | Yi et al. |
| 2021/0406365 A1 | 12/2021 | Neil et al. |
| 2021/0409486 A1 | 12/2021 | Martinez |
| 2022/0012771 A1 | 1/2022 | Gustafson |
| 2022/0030020 A1 | 1/2022 | Huffman |
| 2022/0053011 A1 | 2/2022 | Rao et al. |
| 2022/0060497 A1 | 2/2022 | Crabtree et al. |
| 2022/0086173 A1 | 3/2022 | Yavo et al. |
| 2022/0131888 A1 | 4/2022 | Kanso |
| 2022/0156396 A1 | 5/2022 | Bednash et al. |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |

(56) References Cited

U.S. PATENT DOCUMENTS

| | | |
|---|---|---|
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1 | 12/2022 | Kfir et al. |
| 2022/0407841 A1 | 12/2022 | Karpowicz |
| 2022/0407889 A1 | 12/2022 | Narigapalli et al. |
| 2022/0413879 A1 | 12/2022 | Passey et al. |
| 2022/0414103 A1 | 12/2022 | Upadhyay et al. |
| 2022/0417011 A1 | 12/2022 | Shua |
| 2022/0417219 A1 | 12/2022 | Sheriff |
| 2023/0007014 A1 | 1/2023 | Narayan |
| 2023/0011957 A1 | 1/2023 | Panse et al. |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1 | 3/2023 | Shua |
| 2023/0095756 A1 | 3/2023 | Wilkinson et al. |
| 2023/0110080 A1 | 4/2023 | Hen |
| 2023/0123477 A1 | 4/2023 | Luttwak et al. |
| 2023/0125134 A1 | 4/2023 | Raleigh et al. |
| 2023/0134674 A1 | 5/2023 | Quinn et al. |
| 2023/0135240 A1 | 5/2023 | Cody et al. |
| 2023/0136839 A1 | 5/2023 | Sundararajan et al. |
| 2023/0161614 A1 | 5/2023 | Herzberg et al. |
| 2023/0164148 A1 | 5/2023 | Narayan |
| 2023/0164164 A1 | 5/2023 | Herzberg et al. |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1 | 6/2023 | Horowitz et al. |
| 2023/0208870 A1 | 6/2023 | Yellapragada et al. |
| 2023/0224319 A1 | 7/2023 | Isoyama et al. |
| 2023/0231867 A1 | 7/2023 | Rampura Venkatachar |
| 2023/0237068 A1 | 7/2023 | Sillifant et al. |
| 2023/0254330 A1 | 8/2023 | Singh |
| 2023/0297666 A1 | 9/2023 | Atamli et al. |
| 2023/0325814 A1 | 10/2023 | Vijayan et al. |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1 | 1/2024 | Shen et al. |
| 2024/0037229 A1 | 2/2024 | Pabón et al. |
| 2024/0045838 A1 | 2/2024 | Reiss et al. |
| 2024/0073115 A1 | 2/2024 | Chakraborty et al. |
| 2024/0080329 A1 | 3/2024 | Reed et al. |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

FOREIGN PATENT DOCUMENTS

| | | |
|---|---|---|
| RU | 2421792 C2 | 6/2011 |
| SG | 10202009702 | 4/2021 |

OTHER PUBLICATIONS

Written Opinion of the International Searching Authority, PCT/IB23/55312. ISA/US Commissioner for Patents, Alexandria, Virginia. Dated Aug. 30, 2023.

Microsoft Build. "Introduction to Azure managed disks". Aug. 21, 2023, https://docs.microsoft.com/en-us/azure/virtual-machines/managed-disks-overview.

Ali Gholami; Security and Privacy of Sensitive Data in Cloud Computing: A Survey of Recent Developments; ARIX:2016; pp. 131-150.

Christos Kyrkou; Towards artificial-intelligence-based cybersecurity for robustifying automated driving systems against camera sensor attacks; IEEE 2020; pp. 476-481.

Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).

Henry Hanping Feng; Anomaly Detection Using Call Stack Information; IEEE: Year:2003; pp. 1-14.

International Search Report for PCT Application No. PCT/IB2022/060940 dated Feb. 1, 2023. The International Bureau of WIPO.

International Search Report for PCT/IB2023/050848, dated May 9, 2023. International Bureau of WIPO.

International Search Report of PCT/IB2023/058074, dated Nov. 20, 2023. Searching Authority United States Patent and Trademark Office, Alexandria, Virginia.

Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).

Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).

Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).

Microsoft Docs. "Create a VM from a managed image". Article. Jan. 5, 2022. https://docs.microsoft.com/en-us/azure/virtual-machines/windows/create-vm-generalized-managed.

Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).

No stated author; Downdetector; 2020; retrieved from the Internet https://web.archive.org/web/20201226001244/https://downdetector.com/; pp. 1-8, as printed. (Year: 2020).

No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).

No stated author; IsItoownRightNow; 2020; retrieved from the Internet https://web.archive.org/web/20201202121557/https:// www.isitdownrightnow.com/; pp. 1-2 as printed. (Year: 2020).

Sahil Suneja; Safe Inspection of Live Virtual Machines; IEEE; Year:2017; pp. 97-111.

Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).

Siqi Ma; Certified Copy? Understanding Security Risks of Wi-Fi Hotspot based Android Data Clone Services; ACM; Year: 2021; pp. 320-331.

Written Opinion of the International Searching Authority for PCT Application No. PCT/IB2022/060940 dated Feb. 1, 2023. The International Bureau of WIPO.

Written Opinion of the Searching Authority for PCT/IB2023/050848, dated May 9, 2023. International Bureau of WIPO.

Written Opinion of the Searching Authority of PCT/IB2023/058074, dated Nov. 20, 2023. Searching Authority United States Patent and Trademark Office, Alexandria, Virginia.

Zhang et al. BMC Bioinformatics 2014. "On finding bicliques in bipartite graphs: a novel algorithm and its application to the integration of diverse biological data types". http://www.biomedcentral.com/1471-2105/15/110.

Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).

(56) References Cited

OTHER PUBLICATIONS

Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/ stamp.jsp?tp=&arnumber=9014355 (Year: 2019).

Safaryan, Olga A et al. Cryptographic Algorithm Implementation for Data Encryption in DBMS MS SQL Server. 2020 IEEE East-West Design & Test Symposium (EWDTS). https://ieeexplore.ieee.org/stamp/stamp.jsp?tp=&arnumber=9224775 (Year: 2020).

Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/ stamp.jsp?tp=&arnumber=9250645 (Year: 2020).

\* cited by examiner

TECHNIQUES FOR IMPROVED VIRTUAL INSTANCE INSPECTION UTILIZING DISK CLONING

CROSS-REFERENCE TO RELATED APPLICATIONS

This application is a continuation of U.S. patent application Ser. No. 17/664,508 filed on May 23, 2022, now pending. The contents of the above-referenced application are hereby incorporated by reference.

TECHNICAL FIELD

The present disclosure relates generally to detection of vulnerabilities and exposures in cloud computing environments, and specifically to reducing resources required for detecting cybersecurity threats to a cloud computing environment.

BACKGROUND

Cloud computing infrastructure providers, such as Amazon® Web Services (AWS), Google® Cloud Platform (GCP), Microsoft® Azure, and Oracle® Cloud Infrastructure (OCI), are able to provision hardware resources to multiple tenants (i.e., users and groups of users) by creating an abstraction layer and provisioning the resources as requested.

Tenants in a cloud computing infrastructure may have their own cloud computing environments deployed on top of the infrastructure, with resources provisioned thereto. While the advantages of such cloud computing environments, such as the ability to scale up or down, are well documented, they also carry security risks. Inherently, these cloud computing environments need to be accessed from networks outside of the cloud computing environment in order for example to provide services. This allows not only authorized users to enter the cloud computing environment, but also provides an opportunity for malicious attackers to attempt entry into the cloud computing environment.

Accessing a cloud computing environment allows an attacker to potentially access sensitive data, or utilize the resources of the cloud computing environment for other purposes, such as mining cryptocurrency. It is therefore of primary importance to detect vulnerabilities and exposures in the cloud computing environment, and in workloads such as virtual machines, containers, and serverless functions, deployed therein.

Various solutions exist for scanning workloads deployed in cloud computing environments. Agent-based solutions require an agent to be installed on a workload. This is an additional computational burden, since an agent is an application which requires memory, processing power, etc., to run. Agentless-based solutions, for example, may require generating a snapshot of a disk of a virtual instance (e.g., a virtual machine). When a snapshot is generated, a disk is accessed, a snapshot file is generated, and a second disk is mounted based on the generated snapshot, requiring the intermediate step of generating a snapshot file.

Further, snapshots are generated only of a single disk, which in some instances may be a problem. For example, Microsoft® Azure virtual machines may be deployed using three disk types: an operating system (OS) disk, a temporary disk, and a data disk. Additionally, generating snapshots requires a garbage collection mechanism, as snapshot generation may be interrupted, resulting in garbage data which needs to be purged, and then generating another snapshot until the process is successful.

Figure 5:
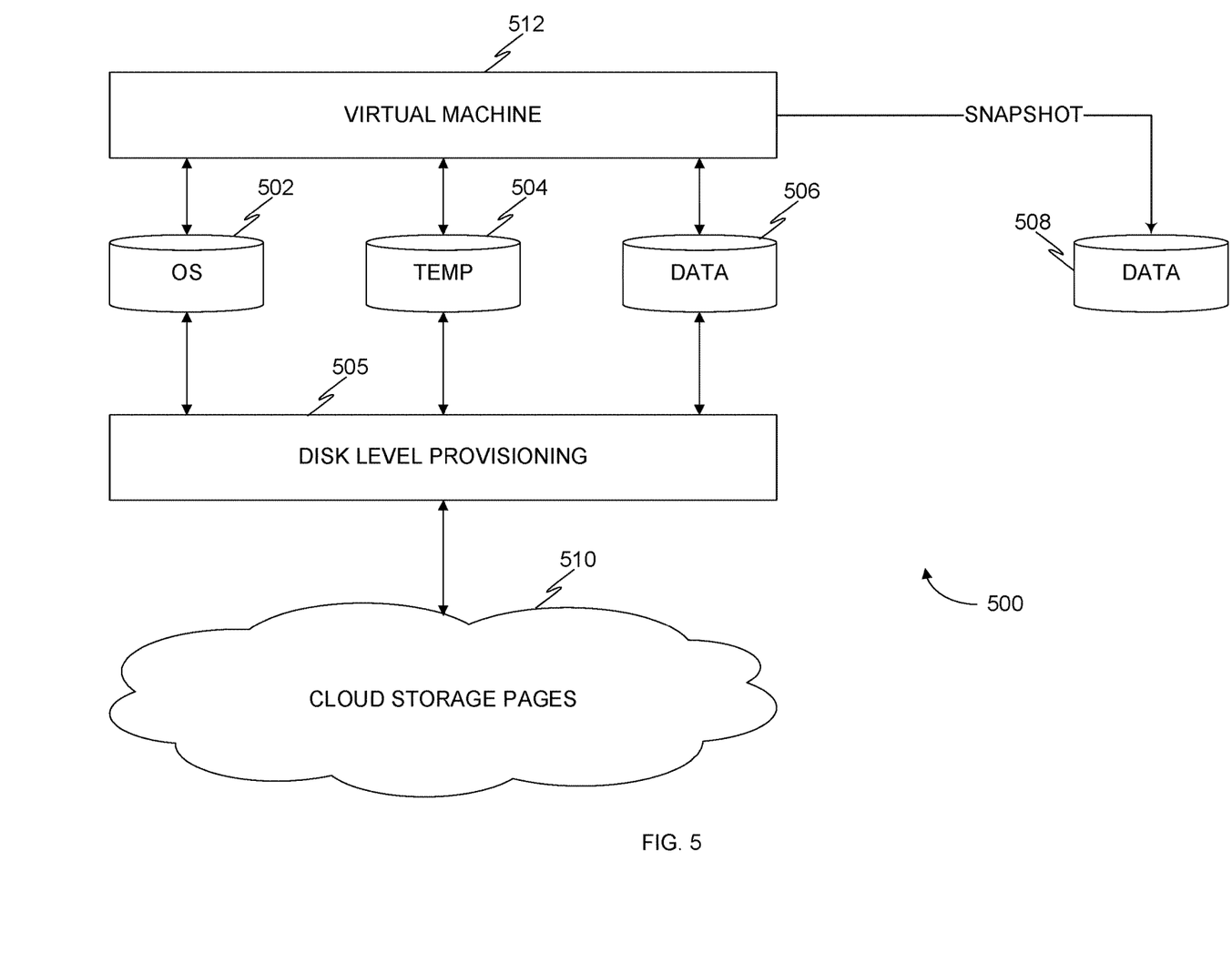
FIG. 5 is a diagram of a virtual machine from which a snapshot is generated, according to the prior art.

FIG. 5 is an example diagram 500 of a virtual machine 512 from which a snapshot is generated, according to the prior art. The virtual machine (VM) 512 is deployed as an Azure® VM. The VM 512 includes a plurality of disks allocated to the VM 512. The VM 512 may be deployed only with an OS disk, with an OS disk and a plurality of data disks, and so on. The plurality of disks includes an operating system (OS) disk 502, an optional temporary disk 504, and at least a data disk 506. The OS disk 502 includes a preinstalled OS, such as Microsoft® Windows, or Linux®. The preinstalled OS is in a boot volume of the OS disk 502. The optional temporary disk 504 may be used for storing temporary data, such as page files, swap files, and the like. The data disk 506 may be used for storing an application, application code, libraries, binaries, application data, and the like. In some configurations, a disk of the plurality of disks may be further encrypted. For example, the OS disk 502, and the data disk 506 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 512 by a disk level provisioning 505. In an embodiment, the disk level provisioning 505 is an application deployed in a cloud computing infrastructure. The disk level provisioning 505 provisions hardware resource to the VM 512 which results in allocation of a disk. The hardware resources are provisioned from cloud storage pages 510 of the cloud computing infrastructure. The hardware resources may be solid state device (SSD) storage, hard disk drive (HDD) storage, optical storage, other magnetic storage, and the like. In an example embodiment, the cloud storage pages 510 are Azure page blobs. A page blob is a collection of a pages, each page having a predetermined size. For example, the predetermined size may be 512-bytes per page.

When a snapshot is created of the VM 512, a disk needs to be selected, as a snapshot is a copy of a disk at a point in time. As a snapshot is based on a single disk, inspection may become complicated when multiple disks are used in coordination. For example, when disk striping is performed between a plurality of disks, coordination needs to be performed between the snapshots. Furthermore, when a disk snapshot 508 is generated, for example, based on the data disk 506, the snapshot process may be interrupted, resulting in pages which need to be deleted by a garbage collection mechanism. Furthermore, the disk snapshot 508 needs to be assigned a permission to an inspector workload, as well as access to an encryption key if the disk from which the snapshot is generated is an encrypted disk.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include selecting a virtual instance in a cloud computing environment, where the virtual instance includes a disk having a disk descriptor with an address in a cloud storage system. Method may also include generating an instruction to clone the disk of the virtual instance, the instruction when executed causes generation of a cloned disk descriptor, the cloned disk descriptor having a data field including the address of the disk of the virtual instance. Method may furthermore include inspecting the cloned disk for a cybersecurity threat. Method may in addition include releasing the cloned disk in response to completing the inspection of the cloned disk. Other embodiments of this aspect include corresponding computer systems, apparatus, and computer programs recorded on one or more computer storage devices, each configured to perform the actions of the methods.

Implementations may include one or more of the following features. Method may include: releasing the cloned disk prior to the cloud computing environment copying a content of the disk of the virtual instance into the cloned disk. Method may include: generating a pointer for the cloned disk descriptor to an encryption key, the encryption key used for encrypting the disk. Method where the cloned disk descriptor includes a pointer to an address of a storage block in a managed storage of the cloud computing environment. Method may include: dereferencing a pointer of the disk of the live virtual instance; and generating a pointer for the cloned disk descriptor based on the dereferenced pointer of the disk of the live virtual instance. Method where inspecting the cloned disk for the cybersecurity threat further may include: inspecting the cloned disk for any one of: an exposure, a vulnerability, a malware, a ransomware, a spyware, a bot, a weak password, an exposed password, an exposed certificate, a misconfiguration, a suspicious event, and any combination thereof. Method may include: deprovisioning the cloned disk descriptor, in response to completing inspecting the at least a disk. Method where the virtual instance remains live during the inspection. Method where the live virtual instance is detected in the cloud computing environment. Method may include: querying a security graph to detect a disk node representing a disk, the disk node connected to a virtual instance node representing the live virtual instance, where the security graph represents the cloud computing environment. Implementations of the described techniques may include hardware, a method or process, or a computer tangible medium.

In one general aspect, non-transitory computer-readable medium may include one or more instructions that, when executed by one or more processors of a device, cause the device to: select a virtual instance in a cloud computing environment, where the virtual instance includes a disk having a disk descriptor with an address in a cloud storage system. Medium may furthermore generate an instruction to clone the disk of the virtual instance, the instruction when executed causes generation of a cloned disk descriptor, the cloned disk descriptor having a data field including the address of the disk of the virtual instance. Medium may in addition inspect the cloned disk for a cybersecurity threat. Medium may moreover release the cloned disk in response to completing the inspection of the cloned disk. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: select a virtual instance in a cloud computing environment, where the virtual instance includes a disk having a disk descriptor with an address in a cloud storage system. System may in addition generate an instruction to clone the disk of the virtual instance, the instruction when executed causes generation of a cloned disk descriptor, the cloned disk descriptor having a data field including the address of the disk of the virtual instance. System may moreover include inspect the cloned disk for a cybersecurity threat. System may also release the cloned disk in response to completing the inspection of the cloned disk. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: release the cloned disk prior to the cloud computing environment copying a content of the disk of the virtual instance into the cloned disk. System where the memory contains further instructions which when executed by the processing circuitry further configure the system to: generate a pointer for the cloned disk descriptor to an encryption key, the encryption key used for encrypting the disk. System where the cloned disk descriptor includes a pointer to an address of a storage block in a managed storage of the cloud computing environment. System where the memory contains further instructions which when executed by the processing circuitry further configure the system to: dereference a pointer of the disk of the live virtual instance; and generate a pointer for the cloned disk descriptor based on the dereferenced pointer of the disk of the live virtual instance. System where the one or more processors, when inspecting the cloned disk for the cybersecurity threat, are configured to: inspect the cloned disk for any one of: an exposure, a vulnerability, a malware, a ransomware, a spyware, a bot, a weak password, an exposed password, an exposed certificate, a misconfiguration, a suspicious event, and any combination thereof. System where the memory contains further instructions which when executed by the processing circuitry further configure the system to: deprovision the cloned disk descriptor, in response to completing inspecting the at least a disk. System where the virtual instance remains live during the inspection. System where the live virtual instance is detected in the cloud computing environment. System where the memory contains further instructions which when executed by the processing circuitry further configure the system to: query a security graph to detect a disk node representing a disk, the disk node connected to a virtual instance node representing the live virtual instance, where the security graph represents the cloud computing environment. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for inspecting a disk (original disk) of a live virtual instance deployed in a production environment of a cloud computing environment. The production environment is a cloud computing environment which provides services, resources, and the like, to users of the production environment. The original disk is cloned into a cloned disk, which includes generating a cloned disk descriptor. The original disk is a virtual disk, which is assigned physical storage by using a disk descriptor. The disk descriptor is a data structure which includes a reference, such as a pointer, to an address of a physical storage of a shared storage scheme in the cloud computing environment. When generated, the cloned disk descriptor contains a pointer which points to the address of the physical storage of the original disk. The cloned disk may then be inspected, while the live virtual instance remains unperturbed. Cloud computing resource usage is reduced, due at least to not having to generate a snapshot of the disk, which would then be mounted and inspected. Further, no copy is generated and therefore data is not physically duplicated, which would require additional storage resources if performed.

Figure 1:
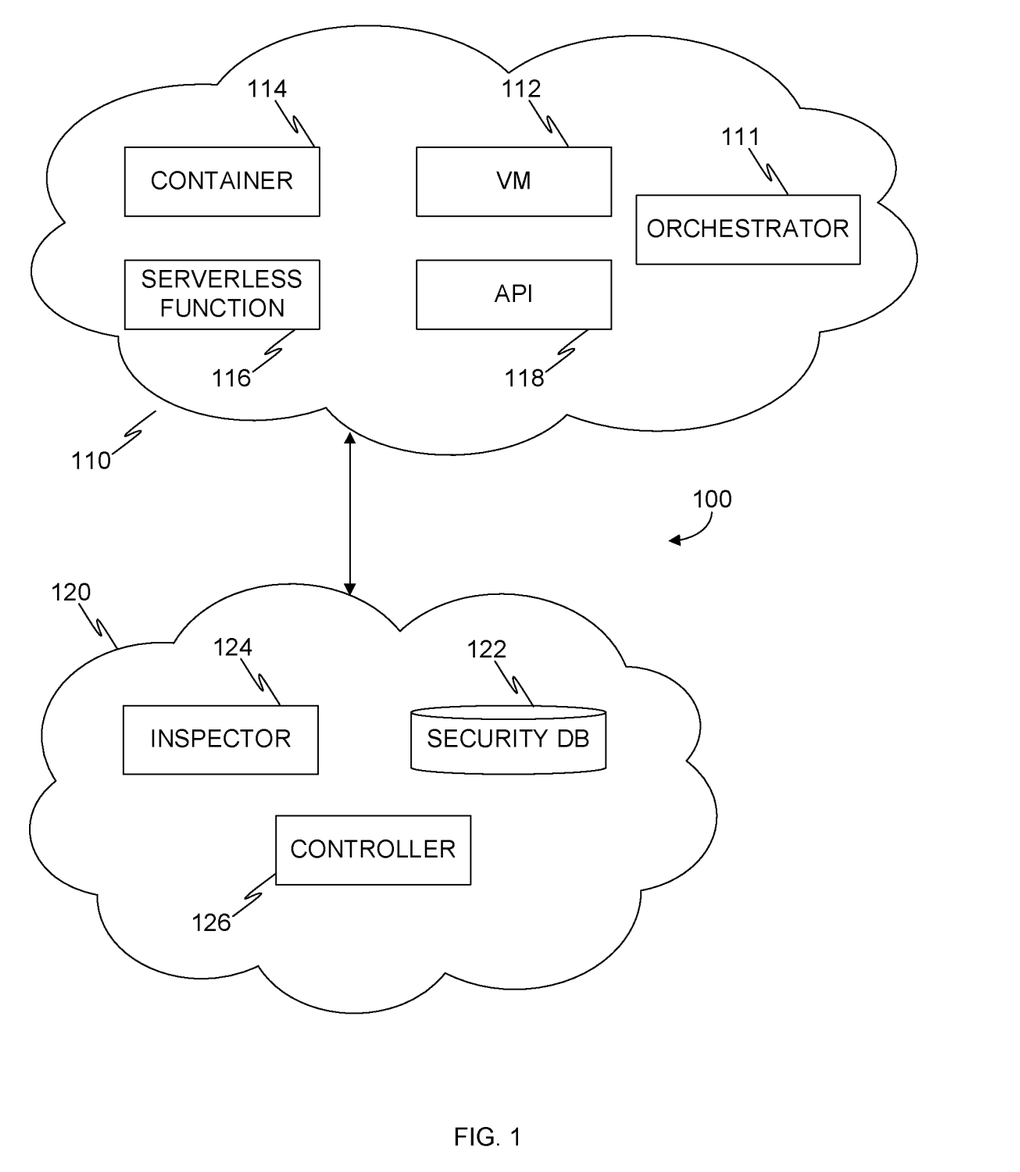
FIG. 1 is a diagram of a cloud computing infrastructure, implemented in accordance with an embodiment.

FIG. 1 is an example of a diagram of a cloud computing infrastructure 100, implemented in accordance with an embodiment. A cloud computing infrastructure 100 may be, for example, Amazon® Web Services (AWS), Google® Cloud Platform (GCP), Microsoft® Azure, Oracle® Cloud Infrastructure (OCI), and the like. In an embodiment, a plurality of cloud computing infrastructures may be utilized, each having at least one cloud computing environment deployed thereon. A cloud computing environment 110 is deployed on the cloud computing infrastructure 100. A cloud computing environment 110 may be, for example, a virtual private cloud (VPC) deployed on Azure.

The cloud computing environment 110 includes cloud entities, such as resources and principals. A resource is a cloud entity which supplies functionality, such as processing power, memory, storage, communication, and the like. A resource may supply more than one functionality. Resources may include, for example, virtual machines (VMs), such as VM 112, container engines such as container engines 114, serverless functions such as serverless functions 116, and the like. As used herein, unless otherwise noted, the terms 'resource', 'virtual instance' and 'workload' are used interchangeably. The cloud computing environment 110 may further include an application programming interface (API), through which actions in the cloud environment may be triggered. A container engine may be implemented using Kubernetes® or Docker®. A serverless function may implemented using Lambda®. A VM may be implemented using Oracle® VirtualBox, Azure Virtual Machines, and the like.

Figure 2:
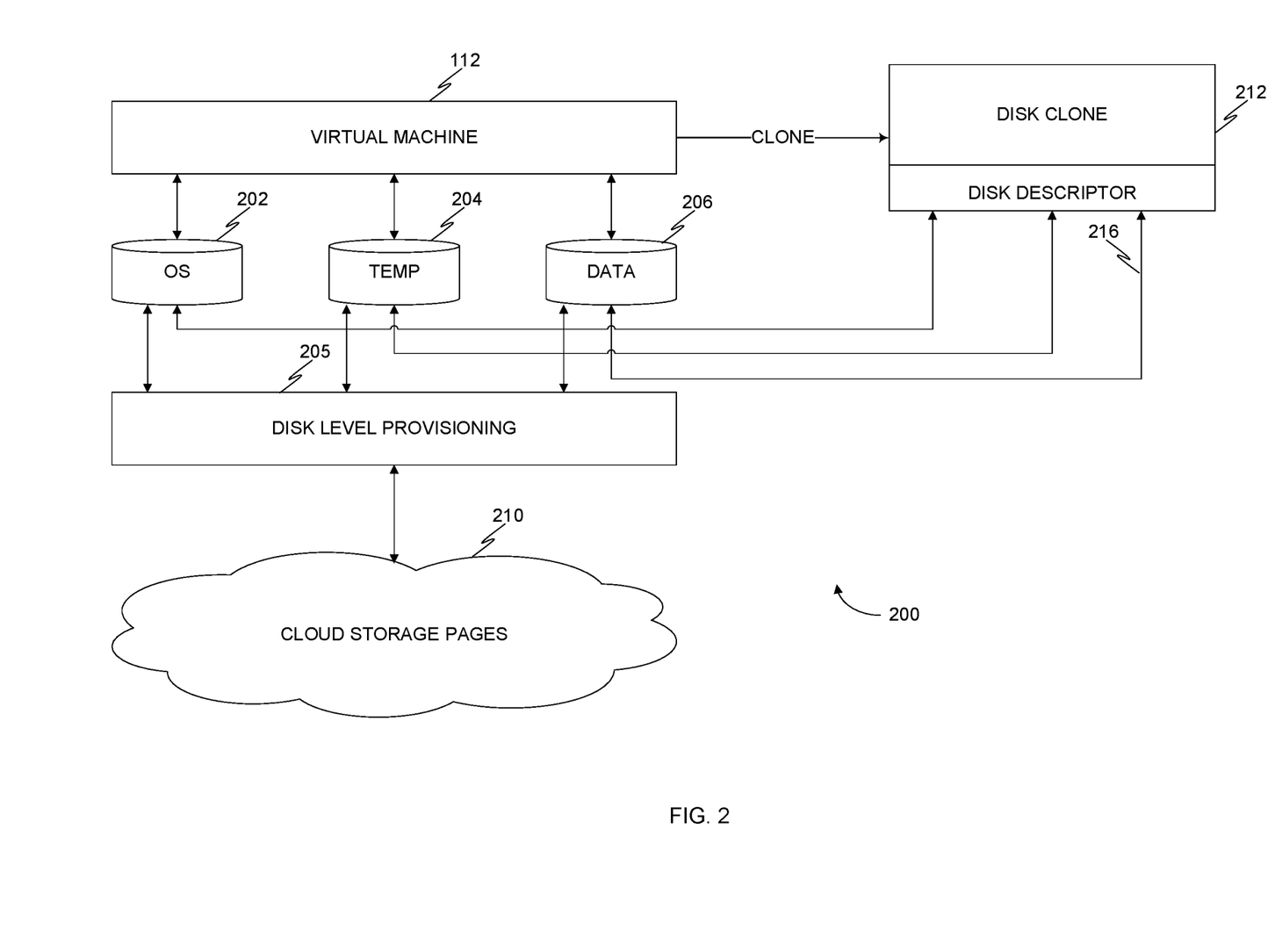
FIG. 2 is a diagram of a virtual machine and a cloned disk thereof, utilized to describe an embodiment.

In an embodiment, an Azure VM is deployed with an operating system (OS) disk, a temporary disk, and at least one data disk. It should be noted a VM may be deployed with only an OS disk, in some embodiments. The at least one data disk is a managed disk which is attached to the VM and used to store, for example, application data, generated content, and the like. The OS disk includes a preinstalled OS and contains a boot volume. The temporary disk is an optional disk which is not managed, and is used for short-term storage, e.g., for storing a page file, a swap file, and the like. An example of a VM 112 is discussed in more detail in FIGS. 2A and 2B below.

A principal is a cloud entity which acts on a resource, meaning it can request, or otherwise initiate, actions or operations in the cloud environment which cause a resource to perform a function. A principal may be, for example, a user account, a service account, a role, and the like. In an embodiment a principal is implemented as a data structure which includes information about an entity, such as username, a password hash, an associated role, and the like.

The cloud computing environment 110 is connected with an inspection environment 120. The inspection environment 120 is a cloud computing environment. In an embodiment, the inspection environment 120 is deployed on the cloud computing infrastructure 100, in another cloud computing infrastructure, or a combination thereof. In certain embodiments a portion of the inspection environment 120 is deployed in the cloud computing environment 110. In some embodiments, certain instances deployed in the inspection environment 120 may be deployed in the cloud computing environment 110.

The inspection environment 120 includes a plurality of inspector workloads, such as inspector 124. The inspector 124 is configured to inspect workloads (i.e., virtual instances) of the cloud computing environment 110. In certain embodiments, an inspector, such as inspector 124, may be configured to inspect other cloud entities, such as user accounts, and the like. In an embodiment, a storage, such as a disk of a virtual machine, may be cloned. As will be discussed below, the cloned disk may be accessed by the inspector 124. The inspector 124 may inspect the cloned disk of the workload for security objects, such as secrets, keys, user account information, and the like. In some embodiments, the inspector 124 inspects the cloned workload for applications, operating systems, binaries, libraries, and the like.

In an embodiment, a cloned disk, which may be a clone of, for example, a data disk, an OS disk, and so on, is generated by generating an instruction, which when executed by the cloud computing environment (e.g., by an orchestrator 111 of the cloud computing environment) generates a disk descriptor, based on a virtual instance descriptor (e.g., a VM descriptor). In a cloud computing environment, an orchestrator 111 is an application which configures, coordinates, and manages applications, deployments, and the like. The virtual instance descriptor includes an address where content of the disk is stored. The address may be, for example, an address of a page in a shared storage scheme. The disk descriptor is a data structure which includes therein a data field which includes the original address from the virtual instance descriptor.

A cloned disk is instantly available for inspection, as generating the disk descriptor is an instant operation. In contrast, generating a snapshot requires copying of data, which is only available for inspection once the snapshot generation is complete. Therefore, disk cloning provides faster access to a disk for inspection, and additionally requires less computing resources for such inspection. This is advantageous as the cloning does not disturb a live virtual instance (i.e., a virtual instance deployed in a production environment) while allowing access to a data disk thereof, without requiring cloud resources other than a generation of a cloned disk descriptor. The inspection of a cloned disk is discussed in further detail below.

The inspection environment 120 further includes a security database 122, which is a graph database. A security graph may be stored on the security database 122. The security graph includes a representation of the cloud computing environment 110. For example, cloud entities of the cloud computing environment 110 may be represented each as nodes in the security graph. In an embodiment the security graph is generated based on objects detected by an inspector, such as inspector 124. In an embodiment, a virtual instance (e.g., a virtual machine) is represented by a node stored in the security graph. A disk, such as OS disk, data disk, and the like, are also represented each by a node, which is connected to the node representing the virtual instance. In certain embodiments, generating an instruction to inspect a virtual instance further includes querying a security graph to determine an identifier of a disk which is connected to the virtual instance, by generating a query to detect a node representing a disk which is connected to another node representing the virtual instance.

A controller 126 is further included in the inspection environment 120. In an embodiment the controller 126 is a workload deployed in the inspection environment 120 which is configured to initiate inspection of the cloud computing environment 110. For example, initiating inspection may include determining what cloud entities to inspect, when to inspect them, and the like.

FIG. 2 is an example diagram 200 of a virtual machine 112 and a cloned disk thereof, utilized to describe an embodiment. While an Azure® cloud computing infrastructure is discussed here, it should be understood that the teachings herein apply equally to other cloud computing infrastructures which offer equal functionality. The VM 112 includes a plurality of disks allocated to the VM 112. The VM 112 may be deployed only with an OS disk, with an OS disk and a plurality of data disks, and so on.

In this example embodiment the plurality of disks includes an operating system (OS) disk 202, an optional temporary disk 204, and at least a data disk 206. The OS disk 202 includes a preinstalled OS, such as Microsoft® Windows, or Linux®. The preinstalled OS is in a boot volume of the OS disk 202. The optional temporary disk 204 may be used for storing temporary data, such as page files, swap files, and the like. The data disk 206 may be used for storing an application, application code, libraries, binaries, application data, and the like. In an embodiment, a plurality of data disks 206 may be allocated to the VM 112. In some configurations, a disk of the plurality of disks may be encrypted. For example, the OS disk 202, and the data disk 206 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 112 by a disk level provisioning 205. In an embodiment, the disk level provisioning 205 is an application deployed in a cloud computing infrastructure. The disk level provisioning 205 provisions hardware resource to the VM 112 which results in allocation of a disk. The hardware resources are provisioned from cloud storage pages 210 of the cloud computing infrastructure. The hardware resources may be solid state device (SSD) storage, hard disk drive (HDD) storage, optical storage, other magnetic storage, and the like. In an example embodiment, the cloud storage pages 210 are Azure page blobs. A page blob is a collection of a pages, each page having a predetermined size. For example, the predetermined size may be 512-bytes per page.

A disk clone 212 (also referred to as cloned disk 212) includes a disk descriptor which includes a reference to an address of a disk of the VM 112. In certain cloud computing infrastructures, when a disk is cloned, a pointer, such as pointer 216 is used to point to an original disk, in this example the data disk 206. In an embodiment, this may be achieved by dereferencing a pointer of the VM 112 which points to the data disk 206, and generating the pointer 216 for the cloned VM 212 to point to the data disk 206. In certain embodiments where a disk is encrypted, a pointer may be generated for the cloned VM 212 to the encryption key.

In an embodiment, the cloning process generates the disk clone 212 as a background process. This is possible due to utilizing diffs. A diff is an additional content that includes the difference between a content at one point in time (e.g., when the original disk was cloned) and a second, later, point in time. Thus, the VM 112 may access the data disk 206 and any diffs generated, or committed, after the disk clone 212 is generated, whereas the disk clone 212 may access only the content of the original data disk 206, and cannot access any diffs generated since.

The cloned disk 212 may then be inspected by an inspector, such as the inspector 124 of the inspection environment 120 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller, such as the controller 126 of FIG. 1, may determine if inspecting a virtual instance requires generating a disk clone or a snapshot. In an embodiment, the determination is performed based on the geographic location of the VM 112, an intended geographic location into which a disk of the VM 112 is cloned, a geographic location of the inspection environment, a number of disks allocated to the virtual instance, or any combination thereof.

By inspecting a cloned disk 212 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 212 is complete, the cloned disk 212 may be spun down, releasing any resources allocated to it, and removing the pointers pointing to the disks of the virtual machine. In an embodiment, the cloned disk 212 may be deleted to accomplish spinning down.

Figure 3:
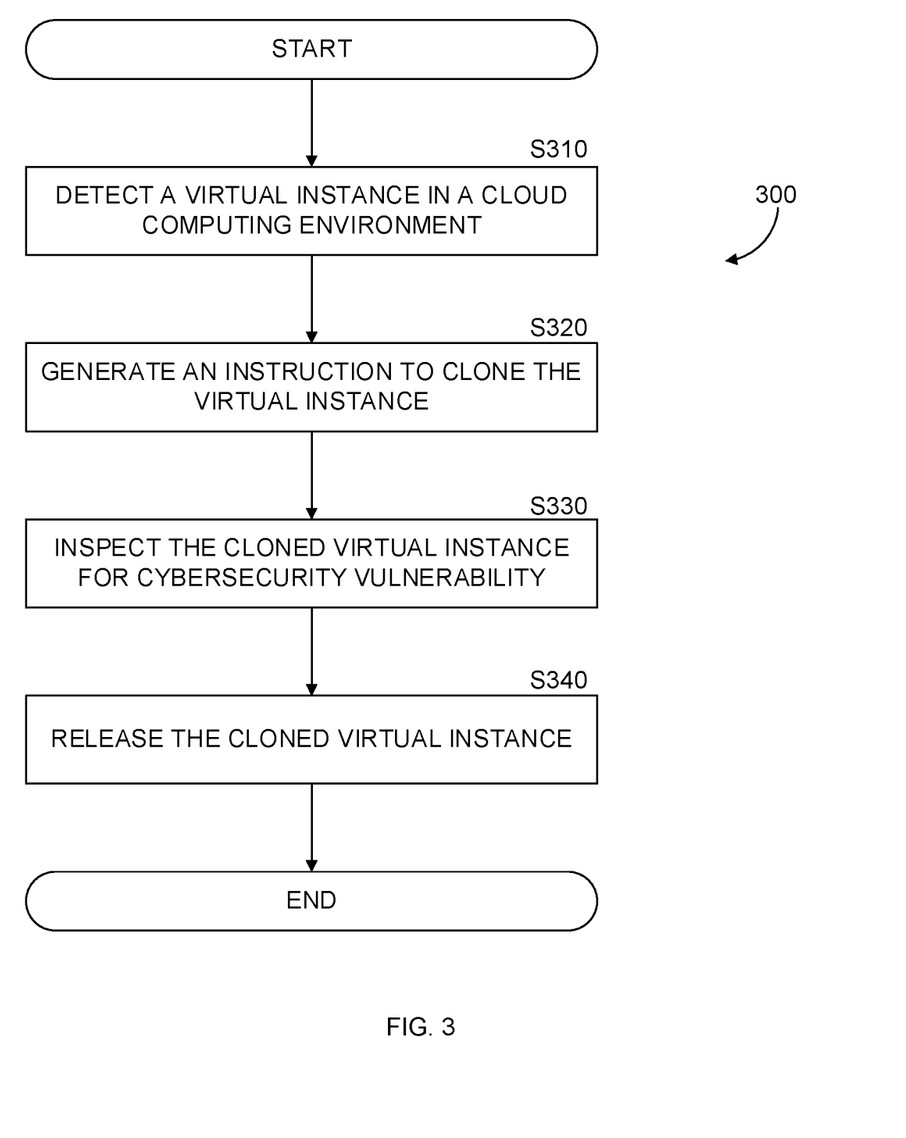
FIG. 3 is a flowchart of a method for generating a disk clone of a virtual instance for vulnerability inspection according to an embodiment.

FIG. 3 is an example flowchart 300 of a method for generating a disk clone of a virtual instance for vulnerability inspection according to an embodiment.

At S310, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S320, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S330, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S340, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 4:
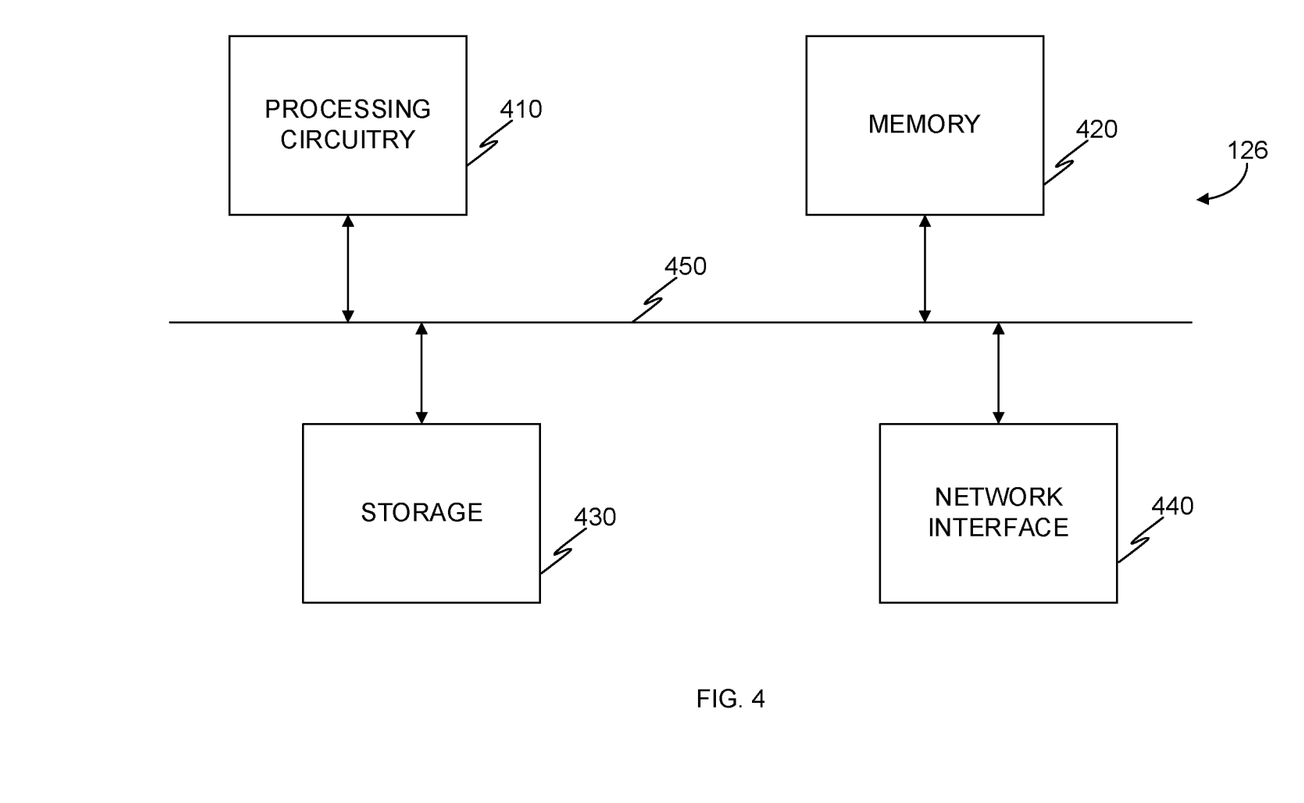
FIG. 4 is a schematic diagram of an inspection controller according to an embodiment.

FIG. 4 is an example schematic diagram of an inspection controller 126 (controller 126) according to an embodiment. The controller 126 includes a processing circuitry 410 coupled to a memory 420, a storage 430, and a network interface 440. In an embodiment, the components of the controller 126 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the controller 126 to communicate with, for example, an inspector 124, a security database 122, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for inspecting virtual instances in a cloud computing environment for cybersecurity threats, comprising:
   selecting a live virtual instance in a production environment of a cloud computing environment, wherein the live virtual instance includes a disk having a disk descriptor with an address in a cloud storage system;
   generating an instruction to clone the disk of the virtual instance, the instruction when executed causes generation of a cloned disk descriptor, the cloned disk descriptor having a data field including the address of the disk of the virtual instance wherein a cloned disk becomes substantially immediately available for inspection in its entirety upon its creation by the execution of the instruction without any copying of data of the disk of the virtual instance, the cloned disk not being associated for operation of any live virtual instance in the production environment;
   inspecting the cloned disk for a cybersecurity threat by an inspector in an inspection environment that is at least logically distinct from the cloud computing environment without requiring resources of the cloud computing environment other than the cloned disk descriptor and while the while the live virtual instance remains live and unperturbed; and
   releasing the cloned disk in response to completing the inspection of the cloned disk.

2. The method of claim 1, further comprising:
releasing the cloned disk prior to the cloud computing environment copying a content of the disk of the virtual instance into the cloned disk.

3. The method of claim 1, further comprising:
generating a pointer for the cloned disk descriptor to an encryption key, the encryption key used for encrypting the disk.

4. The method of claim 1, wherein the cloned disk descriptor includes a pointer to an address of a storage block in a managed storage of the cloud computing environment.

5. The method of claim 1, further comprising:
dereferencing a pointer of the disk of the virtual instance; and
generating a pointer for the cloned disk descriptor based on the dereferenced pointer of the disk of the virtual instance.

6. The method of claim 1, wherein inspecting the cloned disk for the cybersecurity threat further comprises: inspecting the cloned disk for any one of: an exposure, a vulnerability, a malware, a ransomware, a spyware, a bot, a weak password, an exposed password, an exposed certificate, a misconfiguration, a suspicious event, and any combination thereof.

7. The method of claim 1, further comprising:
deprovisioning the cloned disk descriptor, in response to completing inspecting the at least a disk.

8. The method of claim 1, wherein the virtual instance remains live during the inspection.

9. The method of claim 1, wherein the virtual instance is detected in the cloud computing environment.

10. The method of claim 1, further comprising:
querying a security graph to detect a disk node representing a disk, the disk node connected to a virtual instance node representing the virtual instance, wherein the security graph represents the cloud computing environment.

11. The method of claim 1, wherein the instruction to clone the disk of the virtual instance causes generation of the disk clone as a background process.

12. The method of claim 1, wherein the instruction to clone the disk of the virtual instance causes generation of a pointer for the cloned disk descriptor to an encryption key, the encryption key having been used for encrypting the disk of the virtual instance and can be used to decrypt the disk of the virtual instance.

13. A non-transitory computer-readable medium storing a set of instructions for inspecting virtual instances in a cloud computing environment for cybersecurity threats, the set of instructions comprising:
one or more instructions that, when executed by one or more processors of a device, cause the device to:
select a virtual instance in a cloud computing environment, wherein the virtual instance includes a disk having a disk descriptor with an address in a cloud storage system;
generate an instruction to clone the disk of the virtual instance, the instruction when executed causes generation of a cloned disk descriptor, the cloned disk descriptor having a data field including the address of the disk of the virtual instance wherein a cloned disk becomes substantially immediately available for inspection in its entirety upon its creation by the execution of the instruction without any copying of data of the disk of the virtual instance, the cloned disk not being associated for operation of any live virtual instance in the production environment;
inspect the cloned disk for a cybersecurity threat by an inspector in an inspection environment that is at least logically distinct from the cloud computing environment without requiring resources of the cloud computing environment other than the cloned disk descriptor and while the while the live virtual instance remains live and unperturbed; and
release the cloned disk in response to completing the inspection of the cloned disk.

14. A system for inspecting virtual instances in a cloud computing environment for cybersecurity threats comprising:
a processing circuitry; and
a memory, the memory containing instructions that, when executed by the processing circuitry, configure the system to:
select a virtual instance in a cloud computing environment, wherein the virtual instance includes a disk having a disk descriptor with an address in a cloud storage system;
generate an instruction to clone the disk of the virtual instance, the instruction when executed causes generation of a cloned disk descriptor, the cloned disk descriptor having a data field including the address of the disk of the virtual instance wherein a cloned disk becomes substantially immediately available for inspection in its entirety upon its creation by the execution of the instruction without any copying of data of the disk of the virtual instance, the cloned disk not being associated for operation of any live virtual instance in the production environment;
inspect the cloned disk for a cybersecurity threat by an inspector in an inspection environment that is at least logically distinct from the cloud computing environment without requiring resources of the cloud computing environment other than the cloned disk descriptor and while the while the live virtual instance remains live and unperturbed; and
release the cloned disk in response to completing the inspection of the cloned disk.

15. The system of claim 14, wherein the memory contains further instructions which when executed by the processing circuitry further configure the system to:
release the cloned disk prior to the cloud computing environment copying a content of the disk of the virtual instance into the cloned disk.

16. The system of claim 14, wherein the memory contains further instructions which when executed by the processing circuitry further configure the system to:
generate a pointer for the cloned disk descriptor to an encryption key, the encryption key used for encrypting the disk.

17. The system of claim 14, wherein the cloned disk descriptor includes a pointer to an address of a storage block in a managed storage of the cloud computing environment.

18. The system of claim 14, wherein the memory contains further instructions which when executed by the processing circuitry further configure the system to:
dereference a pointer of the disk of the virtual instance; and
generate a pointer for the cloned disk descriptor based on the dereferenced pointer of the disk of the virtual instance.

19. The system of claim 14, wherein the processing circuitry, when inspecting the cloned disk for the cybersecurity threat, are configured to:
inspect the cloned disk for any one of:

an exposure, a vulnerability, a malware, a ransomware, a spyware, a bot, a weak password, an exposed password, an exposed certificate, a misconfiguration, a suspicious event, and any combination thereof.

20. The system of claim 14, wherein the memory contains further instructions which when executed by the processing circuitry further configure the system to:

deprovision the cloned disk descriptor, in response to completing inspecting the at least a disk.

21. The system of claim 14, wherein the virtual instance remains live during the inspection.

22. The system of claim 14, wherein the virtual instance is detected in the cloud computing environment.

23. The system of claim 14, wherein the memory contains further instructions which when executed by the processing circuitry further configure the system to:

query a security graph to detect a disk node representing a disk, the disk node connected to a virtual instance node representing the virtual instance, wherein the security graph represents the cloud computing environment.

* * * * *